United States Patent
Schmidt et al.

(10) Patent No.: US 8,624,411 B2
(45) Date of Patent: Jan. 7, 2014

(54) POWER GENERATION SYSTEM INCLUDING PREDICTIVE CONTROL APPARATUS TO REDUCE INFLUENCES OF WEATHER-VARYING FACTORS

(75) Inventors: Michael Schmidt, Bayern (DE); Christian Heller, Bavaria (DE); Simon Schramm, Germany (DE); Said El-Barbari, Bavaria (DE); Mark Lynass, Bavaria (DE); Kathleen Ann O'Brien, Niskayuna, NY (US); Ralph Teichmann, Schenectady, NY (US); Owen Schelenz, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 102 days.

(21) Appl. No.: 13/273,328

(22) Filed: Oct. 14, 2011

(65) Prior Publication Data
US 2013/0093193 A1    Apr. 18, 2013

(51) Int. Cl.
*F02B 63/04* (2006.01)

(52) U.S. Cl.
USPC .......................................... 290/1 R; 700/291

(58) Field of Classification Search
USPC .................................. 200/1 R; 700/291, 286
See application file for complete search history.

(56) References Cited

U.S. PATENT DOCUMENTS

| 7,783,390 | B2 | 8/2010 | Miller | |
|---|---|---|---|---|
| 2008/0298964 | A1* | 12/2008 | Rimmen | 416/39 |
| 2009/0179662 | A1 | 7/2009 | Moulton et al. | |
| 2010/0114397 | A1* | 5/2010 | Cardinal et al. | 700/297 |
| 2010/0198420 | A1* | 8/2010 | Rettger et al. | 700/291 |
| 2010/0204844 | A1 | 8/2010 | Rettger et al. | |
| 2010/0302819 | A1 | 12/2010 | O'Brien et al. | |
| 2010/0309330 | A1 | 12/2010 | Beck | |
| 2011/0101784 | A1 | 5/2011 | Lopez | |
| 2012/0065803 | A1* | 3/2012 | Teichmann et al. | 700/297 |

FOREIGN PATENT DOCUMENTS

WO    2011124720    10/2011

OTHER PUBLICATIONS

Hummel et al., "Challenges in the Development of Utility-scale Solar Power Plants", EXPO Solar 2011, Aug. 12, 2010, pp. 1-5.
Stein, "Rain or Shine, Sandia National Laboratories' Researchers Find New Ways to Forecast Large Photovoltaic Power Plant Output", Sandia News Releases, Sep. 27, 2010, pp. 1-2.

* cited by examiner

*Primary Examiner* — Vanessa Girardi
(74) *Attorney, Agent, or Firm* — Paul J. DiConza

(57) ABSTRACT

A power generation system (10) for generating electrical power, which may vary in response to one or more weather-varying factors (11). The system may include an array of power generators (12) subject to the weather-varying factor. A module (18) may be configured to predict over a time horizon at least one power-generating condition for the array of power generators. A controller (24) may be configured to anticipatorily adjust a control strategy regarding operation of a component and/or subsystem of the power generation system based on the predicted power-generating condition for the array of power generators over the time horizon.

16 Claims, 4 Drawing Sheets

POWER GENERATION SYSTEM INCLUDING PREDICTIVE CONTROL APPARATUS TO REDUCE INFLUENCES OF WEATHER-VARYING FACTORS

FIELD

The present invention is generally related to power generation, as may involve a power generation system for generating electrical power, which varies in response to one or more weather-varying factors, such as solar irradiance, temperature, wind, and more particularly to predictive control apparatus and techniques to reduce influences of such weather-varying factors.

BACKGROUND

Large-scale generation of electric power based on a freely-available, essentially inexhaustible natural resource, such as solar irradiance and/or wind, continues progressing as an attractive modality for clean and efficient generation of electric power. The weather-induced variability of the natural resource (e.g., due to cloud coverage variability in the case of solar irradiance, or wind variability in the case of wind power) may cause challenges at various levels, such as at a component level (e.g., inverter), at a subsystem level, at a distribution level as well as on the larger power grid. Presently, such power generation systems typically do not anticipatorily adapt control strategies in connection with operational control of one or more components of the power generation system.

In view of the foregoing considerations, it would be desirable to provide apparatus to anticipatorily adjust a control strategy regarding operation of one or more components of the power generation system based on a predicted power generating condition for the array of power generators.

BRIEF DESCRIPTION

Aspects of the present invention may be fulfilled by a power generation system for generating electrical power, which varies in response to at least one weather-varying factor. The system may include an array of power generators subject to the weather-varying factor. The array of power generators may be disposed over respective locations on a field. At least one inverter may be coupled to the array of power generators. A module may be configured to predict over a time horizon at least one power-generating condition for the array of power generators. A controller may be configured to anticipatorily adjust a control strategy regarding operation of the component and/or subsystem of the power generation system based on the predicted power-generating condition for the array of power generators over the time horizon. The control strategy may be a cooling control strategy for the inverter based on the predicted power-generating condition for the array of power generators over the time horizon.

Further aspects of the present invention may be fulfilled by an apparatus, which may include a module configured to predict over a time horizon at least one power-generating condition for an array of power generators. The apparatus may further include a controller configured to anticipatorily adjust a control strategy regarding operation of at least one component and/or subsystem of the power generation system based on the predicted power-generating condition for the array of power generators over the time horizon.

Yet further aspects of the present invention may be fulfilled by a power generation system for generating electrical power, which varies in response to at least one weather-varying factor. The system may include an array of power generators subject to the weather-varying factor. A module may be configured to predict over a time horizon at least one power-generating condition for the array of power generators. A controller may be configured to anticipatorily adjust a control strategy regarding operation of the component and/or subsystem of the power generation system based on the predicted power-generating condition for the array of power generators over the time horizon.

DRAWINGS

These and other features, aspects, and advantages of the present invention will become better understood when the following detailed description is read with reference to the accompanying drawings in which like characters represent like parts throughout the drawings, wherein:

FIG. 1 is a schematic representation of an example embodiment of a power generation system for generating electrical power, as may include an apparatus to anticipatorily adjust a control strategy regarding operation of one or more components of the power generation system based on a predicted power-generating condition for the array of power generators in accordance with aspects of the present invention.

DETAILED DESCRIPTION

Figure 1:
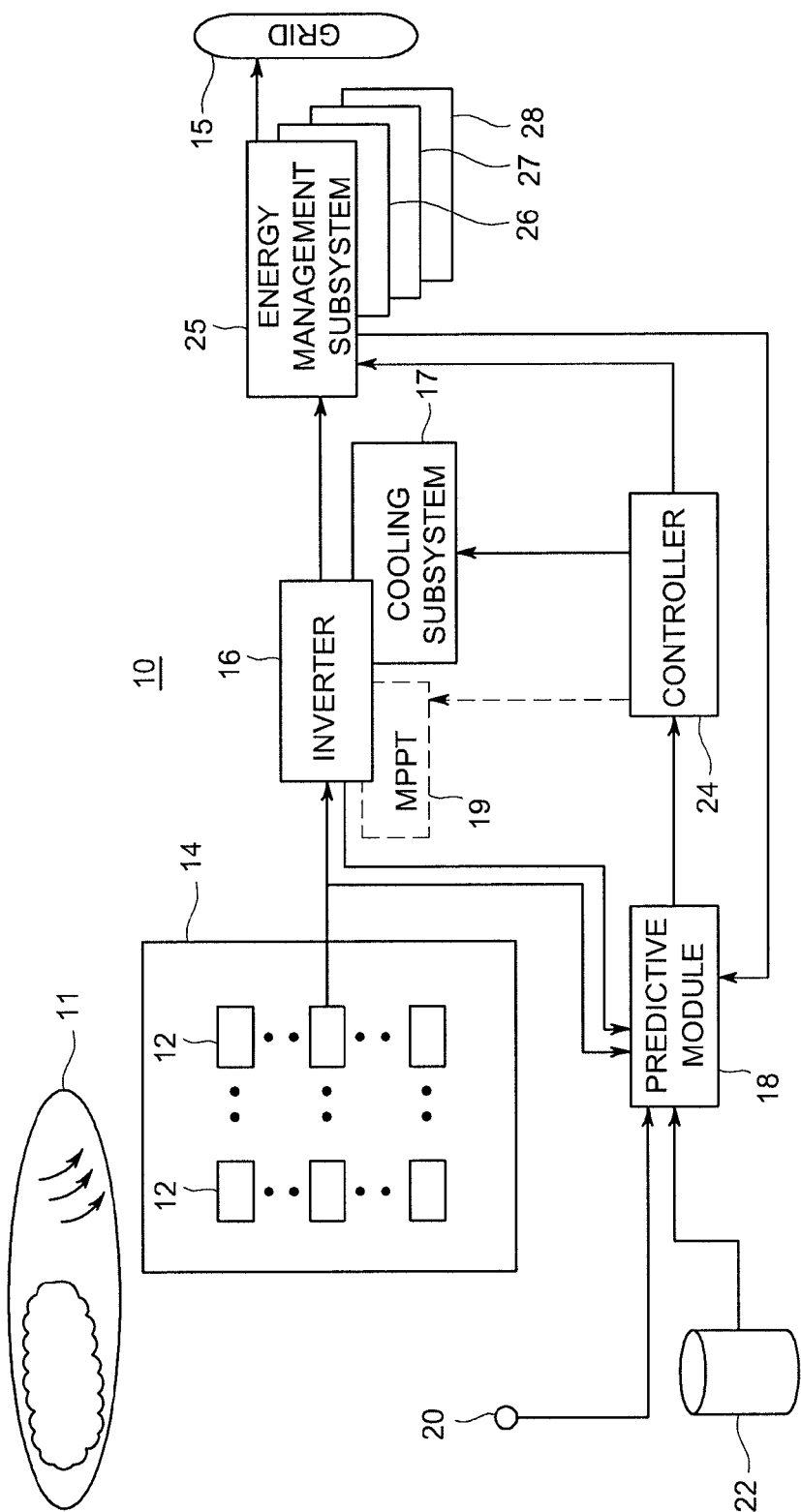

FIG. 1 is a schematic representation of an example embodiment of a power generation system 10 for generating electrical power, which may vary in response to one or more weather-varying factors 11, such as solar irradiance, wind, temperature, etc. An array of power generators 12 may be subject to such weather-varying factors. In the example case where power generators 12 may comprise an array of photovoltaic (PV) modules. Solar irradiance may for example vary based on varying cloud conditions, which can lead to changes in the power generating conditions of the array of photovoltaic modules.

In the example case where power generators 12 may comprise an array of wind turbines. Varying wind conditions can lead to changes in the power generating conditions of the array of wind turbines. Regardless of the specific modality, the array of power generators 12 may be disposed over respective locations (e.g., spaced-apart locations) on a field 14, such as a utility-scale solar farm, and/or a utility-scale wind park, as may involve a relatively large surface area (e.g., potentially hundreds of acres).

In one example embodiment, one or more inverters 16 may be coupled to the array of power generators 12. For example, as will be appreciated by one skilled in the art, photovoltaic arrays naturally produce direct current (DC) power output when exposed to solar irradiance. Thus, in this example, one or more inverters may be used for converting the DC output from the photovoltaic array to an AC signal appropriate for coupling to a power grid 15.

As will be further appreciated by one skilled in the art, wind turbine generators can generate AC power output. However, the frequency and phase of the wind turbine output may depend, respectively, on the speed of rotation and position of a rotor within the turbine generator. Thus, the AC power produced by the wind power system may be initially rectified to produce an intermediate DC power, which is then transformed to AC power via one or more inverters to match the line frequency and phase of power grid 15.

A predictive module 18 may be configured in accordance with aspects of the present invention to predict over a time horizon, as for example may range from seconds to several hours, at least one power-generating condition for the array of power generators 12. In one example embodiment, predictive module 18 may be responsive to weather observations, as may be obtained from a sensor suite 20 and/or weather forecasts, as may be obtained from weather data services, in combination with model data of the power generators to predict the power-generating condition for the array of power generators 12. In one example embodiment, predictive module 18 may be responsive to historical weather data as may be stored in a database 22.

A controller 24 may be configured to anticipatorily adjust a control strategy regarding operation of at least one subsystem and/or component of the power generation system based on the predicted power-generating condition for the array of power generators over the time horizon. In one example embodiment, the control strategy may be a cooling control strategy for inverter 16, as may be implemented by way of a cooling subsystem 17, based on the predicted power-generating condition for the array of power generators 12 over the time horizon.

For example, repetitive and relatively large temperature fluctuations ($\Delta T$) that may develop at the respective junctions of semiconductor power devices (e.g., Insulated Gate Bipolar Transistor (IGBT) and other like devices) of the inverters can detrimentally affect the operational reliability of such devices. Accordingly, it would be desirable to formulate a cooling strategy, which may be based on the predicted power-generating condition for the array of power generators 12 over the time horizon, and which avoids or at least reduces such $\Delta T$ fluctuations and thus increases the reliability and lifetime of these inverter devices.

The predicted power-generating condition can be used for instance to effectively deal with relatively long delays that may be part of the physical response of a given component (e.g., thermal inertia in the case of inverter cooling). As will be appreciated by one skilled in the art by anticipatorily adjusting a control strategy for operating a given component before a change in the power-generating condition of the array of power generators takes effect (e.g., cloud covering the array), one may be able to effectively deal with such time delays.

Figures 2, 3:
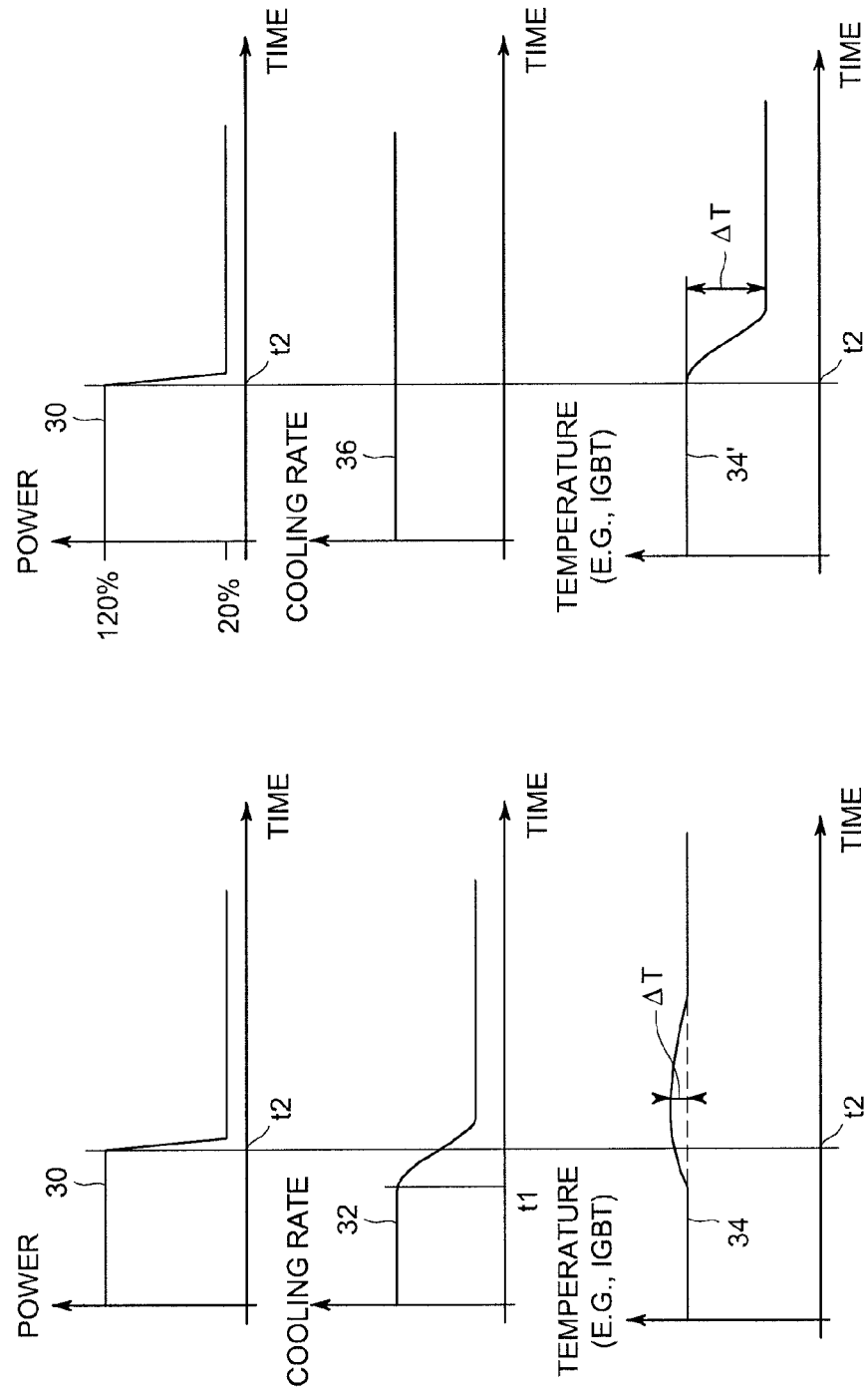
FIG. 2 shows respective plots, which can be used to illustrate an example anticipatory adjusting of a cooling rate for cooling an inverter in accordance with aspects of the present invention.
FIGS. 3 and 4 show respective plots, which can be used to compare example non-anticipatory adjusting of the cooling rate for the inverter relative to the example anticipatory adjusting shown in FIG. 2.

FIG. 2 shows a sequence of respective plots, which can be used to illustrate an example anticipatory adjusting of a cooling rate for inverter cooling and an example temperature response for the power device (e.g., IGBT), which results from such anticipatory adjusting of the inverter cooling rate. Plot 30 indicates a predicted change over a time horizon in the power-generating condition for the array of power generators. For example, at time t2, predictive module 18 (FIG. 1) predicts a drop in the amount of power to be produced by the array of power generators. Plot 32 illustrates an anticipatory cooling rate adjustment, as may be commanded by controller 24 (FIG. 1) starting at time t1 in anticipation of the predicted power drop at time t2. Plot 34 illustrates an example temperature response of an example power device in the inverter. Note the relatively small maximum $\Delta T$ in plot 34.

Figure 4:
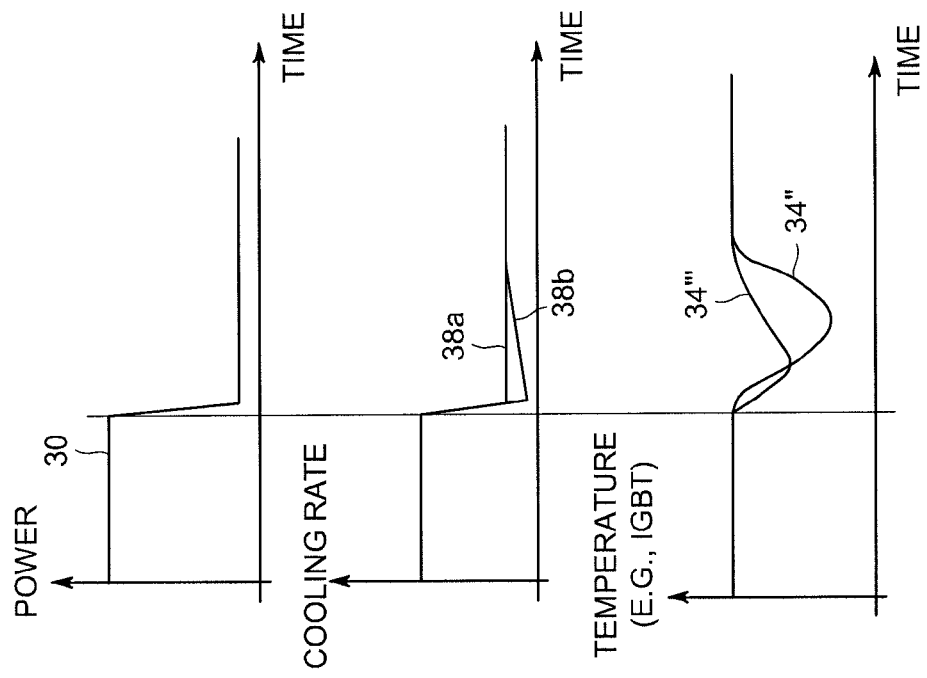

Compare the foregoing response (e.g., relatively small maximum $\Delta t$) relative to the example temperature responses 34', 34", and 34''' respectively illustrated in FIGS. 3 and 4, which do not involve anticipatory adjustment. By way of example, temperature response 34' corresponds to a constant cooling rate, as indicated by plot 36 in FIG. 3 while temperature responses 34" and 34''' respectively correspond to proportional and overproportional cooling rate adjustments, as respectively indicated by plots 38a and 38b in FIG. 4.

It will be appreciated that in lieu of or in combination with adjusting the inverter cooling rate by way of cooling subsystem 15, the cooling strategy to affect the temperature of the power devices may include one or more of the following strategies: adjusting a switching frequency of the semiconductor power devices, adjusting the amount of power generated by the power generator, and/or adjusting the amount of power to be converted by the inverter. As will be appreciated by those skilled in the art, higher switching frequency generally results in higher switching losses and thus results in incremental heating of the power device. Conversely, lower switching frequencies generally results in lower switching losses and thus result in incremental cooling of the power semiconductor device.

In the example situation of clouds blocking solar irradiance over a PV module, the generated power by the PV module will drop, and thus the temperature of the power semiconductor device in the inverter will drop. One example way to compensate for this power generating condition would be increase the switching frequency of the semiconductor switching device to incrementally heat the power switching device and thus reduce the magnitude of the temperature drop. In this example case, the involved time constants are relatively short and this cooling technique may be used to adjust the temperature of the semiconductor switching device relatively quickly.

Figure 5:
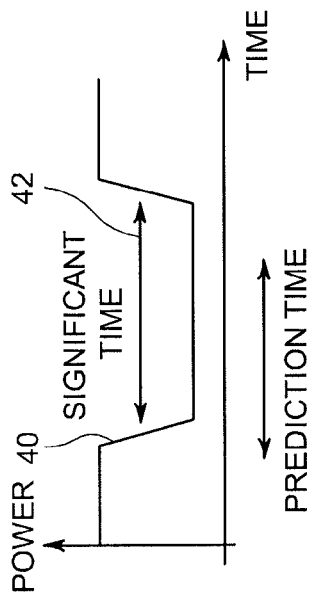
FIGS. 5-7 show respective plots illustrative of different predicted power-generating conditions in connection with an example array of power generators, which may lead to different control strategies.
Figure 6:
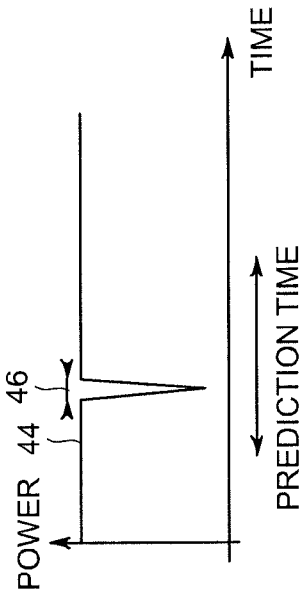
Figure 7:
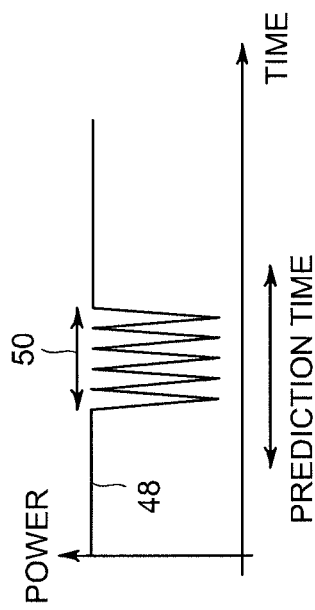

FIGS. 5-7 illustrate plots corresponding to various example predictions over a time horizon regarding power-generating conditions for the array of power generators 12. It will be appreciated that in accordance with further aspects of the present invention, the control strategy to be used may be adapted based on the specific characteristics of the predicted power-generating condition for the array of power generators.

In FIG. 5, plot 40 represents a prediction indicative of a relatively long duration (represented by line 42) of a shift (e.g., power drop) in the amount of power generated by the array of power generators. Compare plot 40 shown in FIG. 5 to plot 44 shown in FIG. 6, which illustrates a prediction indicative of a relatively short duration (represented by line 46) of a shift (e.g., transient shift) in the amount of power generated by the array of power generators. In FIG. 7, plot 48 represents a prediction indicative of a condition corresponding to intermittent fluctuations over a relatively long time interval (represented by line 50) of the power level generated by the array of power generators.

In accordance with aspects of the present invention, the control strategy to be performed may be adapted based on the characteristics of the predicted power-generating condition for the array of power generators. For example, in the example case of a control strategy for inverter cooling, and presuming the predicted reduction of power is relatively long, as illustrated in FIG. 5, then an anticipatory adjustment may be implemented to the inverter cooling rate, as discussed in the context of FIG. 2. However, if the predicted reduction of power is relatively short, such as the transient drop illustrated in FIG. 6, then one may decide not to adjust the cooling strategy since, in this example case, one may choose to rely on the thermal inertia of the system to smooth the $\Delta t$ fluctuation that may develop from the transient power drop.

In the example case illustrated in FIG. 7, such as a prediction of intermittent fluctuations of the power level generated by the array of power generators, one may choose to adjust the cooling strategy relative to an average level of the fluctuations. Accordingly, it will be appreciated that the ability to predict a power-generating condition for the array of power generators may be formulated as an optimal control problem where an appropriate control profile (e.g., cooling profile) may be optimized to ensure minimal or reduced variation of the variable being controlled, such as thermal variation for the power switch devices of inverter 16.

It will be appreciated that the anticipatory control aspects of the present invention are not limited to inverter cooling strategies. For example, as will be appreciated by one skilled in the art, in the event inverter 16 is coupled to an array of PV modules, inverter 16 may include a maximum power point tracker 19 (MPPT), as shown in FIG. 1. In this example case, the MPPP tracking strategies may be anticipatorily adjusted based on the predicted power-generating condition for the array of power generators over the time horizon (e.g., upcoming cloud situation).

Figure 8:
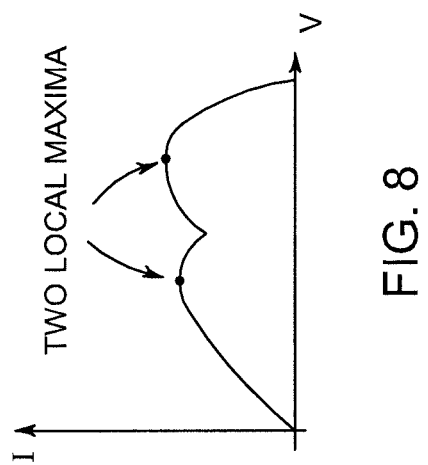
FIG. 8 shows an example current current/voltage (I/V) curve of a PV module, which curve is illustrative of two local maxima, as may develop during a shading condition.

In the example case of an array of PV modules with bypass-diodes, an example current current/voltage (I/V) curve of the PV modules may develop two local maxima during a shading condition. See FIG. 8. Thus, during a shading condition there is a chance the MPPT could sub-optimally track a maximum local power, which is not a global maximum. To avoid such sub-optimal tracking, a global voltage sweep could be performed to appropriately identify the global maximum. However, as will be appreciated by one skilled in the art, performing such a global voltage sweep tends to reduce inverter efficiency since the PV array/inverter circuitry is operated during the sweep in a non-optimal manner. Thus, it would be desirable to avoid performing unnecessary voltage sweeps.

In accordance with further aspects of the present invention, the predicted power-generating condition may be used to improve operation of the MPPT. For example, if the predicted power-generating condition is as illustrated in FIG. 5, (e.g., lasting shading condition), then the tracking strategy may be to perform the global voltage sweep to identify the global maximum. Conversely, if the predicted power generating condition is as illustrated in FIG. 6, (e.g., transient shading condition), or if the predicted power generating condition is as illustrated in FIG. 7, (e.g., undefined irradiance condition) then in either case the control strategy may be not to perform the global voltage sweep. It will be appreciated that the foregoing description should be construed as an example MPPT tracking strategy that may benefit from aspects of the present invention and should not be construed in a limiting sense.

A further example of a subsystem of the power generation system that may benefit from anticipatory control in accordance with aspects of the present invention may include an energy management subsystem 25, as may include one or more electrical storage devices 26, one or more step changers 27 and/or a main circuit breaker 28.

Electrical storage devices 26 may comprise at least one of the following energy storage devices: rechargeable batteries, capacitor banks, inductors, and/or super-capacitors. One example factor that can influence the life-time expectancy of an electrical storage device, such as a rechargeable battery, may be the number of cycles (e.g., from a loaded condition to a discharged condition and so on) the electrical storage device experiences over time. In one example application, the predicted power-generating conditions for the array of power generators 12 may be processed to determine a cycling strategy for the electrical storage devices optimally configured to reduce the number of cycles experienced by the electrical storage device over time.

In another example application, if the predicted power-generating condition for the array of power generators 12 is one of reduced power generation, then one may anticipatorily ensure that the majority of the electrical storage devices are appropriately charged prior to the occurrence of the reduced power generation. Conversely, if the predicted power-generating condition for the array of power generators 12 is one of increased power generation, then one may anticipatorily ensure that the majority of the electrical storage devices are appropriately discharged prior to the occurrence of the increased power generation.

As will be appreciated by those skilled in the art, the voltage level in distribution systems, such for residential applications, may often be controlled by transformers with mechanical switches configured to change the effective number of turns of the transformer. This may involve a tap-changer, which is typically mounted on a lower current side. One example factor that can influence the life-time expectancy of the tap changer may be the number of tap-changing operations performed by the tap changer over time. In one example application, the predicted power-generating conditions for the array of power generators 12 may be processed to determine a tap-changing strategy for the tap changer optimally configured to reduce the number of tap-changing operations experienced by the tap changer over time and thus increase the life expectancy of the tap-changer.

In another example application, main circuit breaker 28 may be set to an electrically-closed condition each time the power-generation system changes to an operational state from a standby condition and vice versa. That is, main circuit breaker 28 may be set to an electrically-open condition each time the power-generation system changes to the standby state from the operational condition. One example factor that can influence the life-time expectancy of the main circuit breaker may be the number of on-off switching operations performed by the main circuit breaker. In one example application, the predicted power-generating conditions for the array of power generators 12 may be processed to determine an on-off switching strategy for the main circuit breaker optimally configured to reduce the number of on-off switching operations experienced by the main circuit breaker and thus increase the life expectancy of the main circuit breaker.

In operation, aspects of the present invention may provide one or more of the following advantages: Increase inverter lifetime and reliability; increase inverter efficiency; improved MPPT tracking strategies in systems involving PV energy generation; increase lifetime of step changers in distribution grids for voltage controls; increase lifetime of circuit breakers and/or energy storage devices, as may be part of an energy management subsystem. The foregoing should not be construed in a limiting sense being that such a description is just meant to illustrate some example advantages that may be achieved from aspects of the present invention.

While only certain features of the invention have been illustrated and described herein, many modifications and changes, will occur to those skilled in the art. It is, therefore, to be understood that the appended claims are intended to cover all such modifications and changes as fall within the true spirit of the invention.

The invention claimed is:

1. A power generation system for generating electrical power, which varies in response to at least one weather-varying factor, the system comprising:
   an array of power generators subject to said at least one weather-varying factor, the array of power generators disposed over respective locations on a field;
   a module configured to predict over a time horizon at least one power-generating condition for the array of power generators; and
   a controller configured to anticipatorily adjust a control strategy regarding operation of at least one component and/or subsystem of the power generation system based on the predicted power-generating condition for the array of power generators over the time horizon, wherein the array of power generators is selected from the group consisting of an array of photovoltaic modules, an array of wind turbines and a combination of said arrays, wherein said at least one component comprises at least one inverter coupled to the array of power generators, wherein the control strategy comprises a cooling control strategy for said at least one inverter based on the predicted power-generating condition for the array of power generators over the time horizon, and further wherein the cooling control strategy for said at least one inverter is selected from the group consisting of a control strategy regarding a cooling flow rate for said at least one inverter, a control strategy regarding a switching frequency for at least one power switch of said at least one inverter, a control strategy regarding an amount of power generated by at least one of the power generators, a control strategy regarding an amount of power to be converted by said at least one inverter and a control strategy comprising a combination of at least two of the foregoing cooling control strategies.

2. A power generation system for generating electrical power, which varies in response to at least one weather-varying factor, the system comprising:
   an array of power generators subject to said at least one weather-varying factor, the array of power generators disposed over respective locations on a field, wherein the array of power generators is selected from the group consisting of an array of photovoltaic modules, an array of wind turbines and a combination of said arrays;
   at least one inverter coupled to the array of power generators;
   a module configured to predict over a time horizon at least one power-generating condition for the array of power generators; and
   a controller configured to anticipatorily adjust a control strategy regarding operation of at least one component and/or subsystem of the power generation system based on the predicted power-generating condition for the array of power generators over the time horizon, wherein the control strategy comprises a cooling control strategy for said at least one inverter based on the predicted power-generating condition for the array of power generators over the time horizon, wherein the cooling control strategy for said at least one inverter is selected from the group consisting of a control strategy regarding a cooling flow rate for said at least one inverter, a control strategy regarding a switching frequency for at least one power switch of said at least one inverter, a control strategy regarding an amount of power generated by at least one of the power generators, a control strategy regarding an amount of power to be converted by said at least one inverter and a control strategy comprising a combination of at least two of the foregoing cooling control strategies.

3. The power generation system of claim 2, wherein the predicted power-generating condition comprises a condition corresponding to intermittent fluctuations of a power level generated by the array of power generators.

4. The power generation system of claim 2, wherein the array of power generators comprises an array of photovoltaic generators, wherein said at least one component comprises at least one inverter coupled to the array of photovoltaic generators, wherein said at least one inverter comprises a maximum power point tracker, and wherein the control strategy comprises a tracking control strategy performed by the maximum power point tracker based at least in part on the predicted power-generating condition.

5. The power generation system of claim 2, wherein said at least one component comprises at least one electrical storage device, wherein the control strategy comprises a power flow control strategy into or from said at least one electrical storage device based at least in part on the predicted power-generating condition over the time horizon.

6. The power generation system of claim 2, wherein said at least one component comprises at least one tap changer, wherein the control strategy comprises a tap-changing control strategy for said at least one tap changer based at least in part on the predicted power-generating condition over the time horizon.

7. The power generation system of claim 2, wherein said at least one component comprises at least one circuit breaker, wherein the control strategy comprises a switching control strategy for said at least one at least one circuit breaker based at least in part on the predicted power-generating condition over the time horizon.

8. The power generation system of claim 2, wherein the predicted power-generating condition comprises a condition corresponding to a shift in an amount of power generated by the array of power generators.

9. The power generation system of claim 8, wherein the predicted power-generating condition further includes estimating a duration of time of the condition corresponding to the shift in the amount of power generated by the array of power generators.

10. In a power generation system for generating electrical power, which varies in response to at least one weather-varying factor, the power generation system having an array of power generators subject to said at least one weather-varying factor, apparatus comprising:
    a module configured to predict over a time horizon at least one power-generating condition for the array of power generators; and
    a controller configured to anticipatorily adjust a control strategy regarding operation of at least one component and/or subsystem of the power generation system based on the predicted power-generating condition for the array of power generators over the time horizon, wherein the array of power generators is selected from the group consisting of an array of photovoltaic modules, an array of wind turbines and a combination of said arrays, wherein said at least one component comprises at least one inverter coupled to the array of power generators, wherein the control strategy comprises a cooling control strategy for said at least one inverter based on the predicted power-generating condition for the array of power generators over the time horizon, and further wherein the cooling control strategy for said at least one inverter is selected from the group consisting of a control strategy regarding a cooling flow rate for said at least one inverter, a control strategy regarding a switching frequency for at least one power switch of said at least one inverter, a control strategy regarding an amount of power generated by at least one of the power generators, a control strategy regarding an amount of power to be converted by said at least one inverter and a control strategy comprising a combination of at least two of the foregoing cooling control strategies.

11. The apparatus of claim 10, wherein the predicted power-generating condition comprises a condition corresponding to a shift in an amount of power generated by the array of power generators, wherein the predicted power-generating condition further includes estimating a duration of time of the condition corresponding to the shift in the amount of power generated by the array of power generators.

12. The apparatus of claim 10, wherein the predicted power-generating condition comprises a condition corresponding to intermittent fluctuations of a power level generated by the array of power generators.

13. The apparatus of claim 10, wherein the array of power generators comprises an array of photovoltaic generators, wherein said at least one component comprises at least one inverter coupled to the array of photovoltaic generators, wherein said at least one inverter comprises a maximum power point tracker, and wherein the control strategy comprises a tracking control strategy performed by the maximum power point tracker based at least in part on the predicted power-generating condition.

14. The apparatus of claim 10, wherein said at least one component further comprises at least one electrical storage device, wherein the control strategy comprises a power flow control strategy into or from said at least one electrical storage device based at least in part on the predicted power-generating condition over the time horizon.

15. The apparatus of claim 10, wherein said at least one component further comprises at least one tap changer, wherein the control strategy comprises a tap-changing control strategy for said at least one tap changer based at least in part on the predicted power-generating condition over the time horizon.

16. The apparatus of claim 10, wherein said at least one component further comprises at least one circuit breaker, wherein the control strategy comprises a switching control strategy for said at least one at least one circuit breaker based at least in part on the predicted power-generating condition over the time horizon.

* * * * *

UNITED STATES PATENT AND TRADEMARK OFFICE
CERTIFICATE OF CORRECTION

PATENT NO. : 8,624,411 B2
APPLICATION NO. : 13/273328
DATED : January 7, 2014
INVENTOR(S) : Schmidt et al.

It is certified that error appears in the above-identified patent and that said Letters Patent is hereby corrected as shown below:

In the Specification

In Column 4, Lines 18-19, delete "cooling subsystem 15," and insert -- cooling subsystem 17, --, therefor.

In the Claims

In Column 8, Line 34, in Claim 7, delete "at least one at least one" and insert -- at least one --, therefor.

In Column 10, Line 22, in Claim 16, delete "at least one at least one" and insert -- at least one --, therefor.

Signed and Sealed this
Second Day of December, 2014

Michelle K. Lee
*Deputy Director of the United States Patent and Trademark Office*